(12) United States Patent
Leroux-Gamelin

(10) Patent No.: US 11,124,214 B2
(45) Date of Patent: Sep. 21, 2021

(54) BEACH TROLLEY

(71) Applicant: Jean-Michel Leroux-Gamelin, Les Cèdres (CA)

(72) Inventor: Jean-Michel Leroux-Gamelin, Les Cèdres (CA)

( * ) Notice: Subject to any disclaimer, the term of this patent is extended or adjusted under 35 U.S.C. 154(b) by 43 days.

(21) Appl. No.: 16/834,305

(22) Filed: Mar. 30, 2020

(65) Prior Publication Data

US 2020/0317243 A1 Oct. 8, 2020

(51) Int. Cl.
*B62B 3/02* (2006.01)
*B62B 5/08* (2006.01)
*B60C 5/00* (2006.01)
*B60C 29/04* (2006.01)
*B62B 5/06* (2006.01)

(52) U.S. Cl.
CPC .................. *B62B 3/02* (2013.01); *B60C 5/00* (2013.01); *B60C 29/04* (2013.01); *B62B 5/067* (2013.01); *B62B 5/082* (2013.01); *B62B 2202/52* (2013.01)

(58) Field of Classification Search
CPC .............. B62B 3/02; B62B 3/022; B62B 3/12
USPC ........................................... 280/644, 651, 62
See application file for complete search history.

(56) References Cited

U.S. PATENT DOCUMENTS

| | | | | |
|---|---|---|---|---|
| 3,826,511 A | * | 7/1974 | Frank | B62B 1/208 280/653 |
| 4,781,397 A | * | 11/1988 | Burn | B62B 1/208 280/47.18 |
| 4,865,346 A | * | 9/1989 | Carlile | B62B 1/12 280/654 |
| 4,902,027 A | * | 2/1990 | Skelly | B62B 3/12 280/33.998 |
| 5,265,892 A | * | 11/1993 | Said | B62B 19/02 280/30 |
| 5,269,157 A | * | 12/1993 | Ciminelli | A45B 11/00 280/47.18 |
| 5,362,079 A | | 11/1994 | Graham | |

(Continued)

FOREIGN PATENT DOCUMENTS

| | | |
|---|---|---|
| CA | 3039250 | 7/2019 |
| CA | 3039250 | 3/2020 |

(Continued)

*Primary Examiner* — Jeffrey J Restifo
(74) *Attorney, Agent, or Firm* — Agence de Brevets Fournier

(57) ABSTRACT

A beach trolley includes two lateral arms, a central arm therebetween and a pulling arm that is aligned with the central arm. Each of the two lateral arms and central arm having a removable inflatable wheel at one end and being joined at the other end for pivotal movement between a trolling configuration wherein the two lateral arms and the central arm generally lie within a same plane and a compact configuration wherein the two lateral arms and the central arm are generally parallel. The pulling arm is joined to the two lateral arms and the central arm for pivotal movements towards and away the two lateral arms and the central arm. The beach trolley further includes a flexible seat attached to the arms to form a) a seat therebetween when the two lateral arms and the central arm are in the trolling configuration and b) a bag therewith when i) the two lateral arms and the central arm are in the compact configuration and ii) the pulling arm is pivoted so as to be generally parallel to the two lateral arms and the central arm.

22 Claims, 8 Drawing Sheets

(56) References Cited

U.S. PATENT DOCUMENTS

| | | | | |
|---|---|---|---|---|
| 5,636,852 A * | 6/1997 | Sistrunk | ............. | B62B 1/12 |
| | | | | 248/156 |
| 5,944,333 A * | 8/1999 | Kent | ............. | B62K 27/003 |
| | | | | 280/204 |
| 5,957,145 A * | 9/1999 | Plumer | ............. | B62B 1/262 |
| | | | | 135/16 |
| 6,079,777 A * | 6/2000 | Simmons | ............. | B62B 3/02 |
| | | | | 297/217.1 |
| 6,131,925 A * | 10/2000 | Weldon | ............. | B62B 1/12 |
| | | | | 280/30 |
| 6,354,619 B1 * | 3/2002 | Kim | ............. | B62B 3/106 |
| | | | | 280/649 |
| 6,428,033 B1 * | 8/2002 | Harrison | ............. | A47C 4/286 |
| | | | | 280/644 |
| 6,491,318 B1 * | 12/2002 | Galt | ............. | B62B 3/02 |
| | | | | 280/42 |
| 6,533,310 B2 * | 3/2003 | O'Shea | ............. | B62B 7/06 |
| | | | | 280/62 |
| 6,634,650 B2 | 10/2003 | Lerner | | |
| 7,017,940 B2 * | 3/2006 | Hatfull | ............. | B62B 1/208 |
| | | | | 280/652 |
| 7,077,422 B2 * | 7/2006 | Haury | ............. | A61G 5/08 |
| | | | | 280/644 |
| D606,273 S * | 12/2009 | Anderson | ............. | D34/18 |
| 7,677,591 B2 | 3/2010 | Chapman | | |
| 7,762,363 B1 * | 7/2010 | Hirschfeld | ............. | B60K 7/0007 |
| | | | | 180/65.1 |
| 7,963,530 B1 * | 6/2011 | Garcia | ............. | B62B 3/02 |
| | | | | 280/30 |
| 8,181,811 B1 * | 5/2012 | Blake | ............. | A45F 3/44 |
| | | | | 220/475 |
| 8,851,504 B1 * | 10/2014 | Goldszer | ............. | B62B 3/02 |
| | | | | 280/651 |
| 8,882,135 B1 * | 11/2014 | Chen | ............. | B62B 3/02 |
| | | | | 280/651 |
| 9,260,124 B1 * | 2/2016 | Yim | ............. | B62B 3/12 |
| 9,908,570 B1 * | 3/2018 | Mayers | ............. | B62B 5/067 |
| 9,937,946 B1 * | 4/2018 | Gillis | ............. | B62B 7/145 |
| 9,969,227 B1 * | 5/2018 | McNeave | ............. | B60F 3/0069 |
| 10,610,025 B1 * | 4/2020 | Zhu | ............. | A47C 13/00 |
| 2003/0015858 A1 * | 1/2003 | Chu | ............. | B62B 1/12 |
| | | | | 280/652 |
| 2003/0137131 A1 * | 7/2003 | Strange | ............. | B62B 3/027 |
| | | | | 280/651 |
| 2008/0061524 A1 * | 3/2008 | Goldszer | ............. | B62B 3/02 |
| | | | | 280/47.34 |
| 2008/0217886 A1 * | 9/2008 | Poppinga | ............. | B62B 3/007 |
| | | | | 280/651 |
| 2008/0296855 A1 * | 12/2008 | Roseman | ............. | B62B 3/027 |
| | | | | 280/33.993 |
| 2009/0230646 A1 * | 9/2009 | Chapman | ............. | B62B 1/12 |
| | | | | 280/47.19 |
| 2010/0059950 A1 * | 3/2010 | Coghill, Jr. | ............. | B62B 1/14 |
| | | | | 280/47.26 |
| 2010/0102524 A1 * | 4/2010 | Larsen | ............. | B62B 3/02 |
| | | | | 280/35 |
| 2010/0176568 A1 * | 7/2010 | Kilday | ............. | B62B 3/12 |
| | | | | 280/79.11 |
| 2011/0025005 A1 * | 2/2011 | Howell | ............. | B62B 3/022 |
| | | | | 280/47.24 |
| 2011/0079987 A1 * | 4/2011 | Wu | ............. | B62B 3/106 |
| | | | | 280/655 |
| 2012/0160576 A1 * | 6/2012 | Anasiewicz | ............. | B62B 3/02 |
| | | | | 180/19.1 |
| 2012/0187662 A1 * | 7/2012 | Riddiford | ............. | B62B 1/008 |
| | | | | 280/652 |
| 2012/0205884 A1 * | 8/2012 | Craven | ............. | B62B 1/008 |
| | | | | 280/47.3 |
| 2013/0154213 A1 * | 6/2013 | Marquez-Molina | ..... | A45C 3/00 |
| | | | | 280/35 |
| 2013/0300090 A1 * | 11/2013 | Wang | ............. | A63B 55/60 |
| | | | | 280/651 |
| 2014/0001735 A1 * | 1/2014 | Yang | ............. | B62B 3/02 |
| | | | | 280/651 |
| 2014/0339038 A1 * | 11/2014 | Welker | ............. | A45C 13/385 |
| | | | | 190/18 A |
| 2015/0061239 A1 * | 3/2015 | Riddiford | ............. | B60B 19/00 |
| | | | | 280/5.28 |
| 2016/0185374 A1 * | 6/2016 | Zhang | ............. | B62B 3/02 |
| | | | | 280/651 |
| 2018/0327011 A1 * | 11/2018 | Horowitz | ............. | B62B 5/065 |
| 2019/0135323 A1 * | 5/2019 | Avigdor | ............. | B62B 9/20 |
| 2019/0358995 A1 * | 11/2019 | Kurtz | ............. | B60B 3/08 |
| 2020/0023875 A1 * | 1/2020 | Zhu | ............. | B62B 3/02 |
| 2020/0039554 A1 * | 2/2020 | O'Dell | ............. | B60R 22/18 |
| 2020/0189638 A1 * | 6/2020 | Zhu | ............. | B62B 5/067 |
| 2020/0317243 A1 * | 10/2020 | Leroux-Gamelin | .... | B60C 29/04 |
| 2021/0114643 A1 * | 4/2021 | Sun | ............. | B62B 5/067 |

FOREIGN PATENT DOCUMENTS

| | | |
|---|---|---|
| FR | 2 785 587 | 5/2000 |
| GB | 2 255 053 A | 10/1992 |
| WO | WO 2007/116107 A1 | 10/2007 |

* cited by examiner

BEACH TROLLEY

CROSS REFERENCE TO RELATED PATENT APPLICATION

This application claims the benefit of Canadian Patent Application No. 3,039,250, filed on Apr. 4, 2019, the content of which is incorporated by reference herein.

FIELD

The present disclosure relates to trolleys to carry children and related accessories. More specifically, the present disclosure is concerned with such a trolley that is suitable for the beach.

BACKGROUND

Baby strollers are well-known to move babies or small children and some accessories. Most baby strollers are movable between deployed and compact configuration. They are however not adapted for use on a beach or more generally on a sandy ground. Moreover, they are conceived to carry a child or a baby with limited spaces to carry items or bags.

While it is known to provide oversized so called 'beach' wheels to conventional carts or strollers, such transport vehicle remains difficult to move in sand and/or cumbersome to carry or move in cramped or crowded places.

A transport vehicle adapted to carry children and other loads on a beach and that can be easily moved from a trolling configuration to a portable collapse configuration for its transport or storing is thus desirable.

SUMMARY

According to an illustrative embodiment, there is provided a beach trolley comprising:

two lateral arms and a central arm, each having a removable wheel at one end and being together joined at the other end for pivotal movement between a trolling configuration wherein the two lateral arms and the central arm generally lie within a same plane and a compact configuration wherein the two lateral arms and the central arm are generally parallel;

a pulling arm joined to the two lateral arms and the central arm for pivotal movements towards and away the two lateral arms and the central arm; the pulling arm generally lying within a same plane than the central arm; and a flexible seat attached to the two lateral arms, to the central arm and to the pulling arm to form a seat therebetween when the two lateral arms and the central arm are in the trolling configuration and to form a bag therewith when i) the two lateral arms and the central arm are in the compact configuration and ii) the pulling arm is pivoted so as to be generally parallel to the two lateral arms and the central arm.

The expression 'trolley' is not to be construed in the description and in the claims in any limited way as to its functions.

Other objects, advantages and features of the beach trolley will become more apparent upon reading the following non-restrictive description of preferred embodiments thereof, given by way of example only with reference to the accompanying drawings.

DETAILED DESCRIPTION

Figure 1:
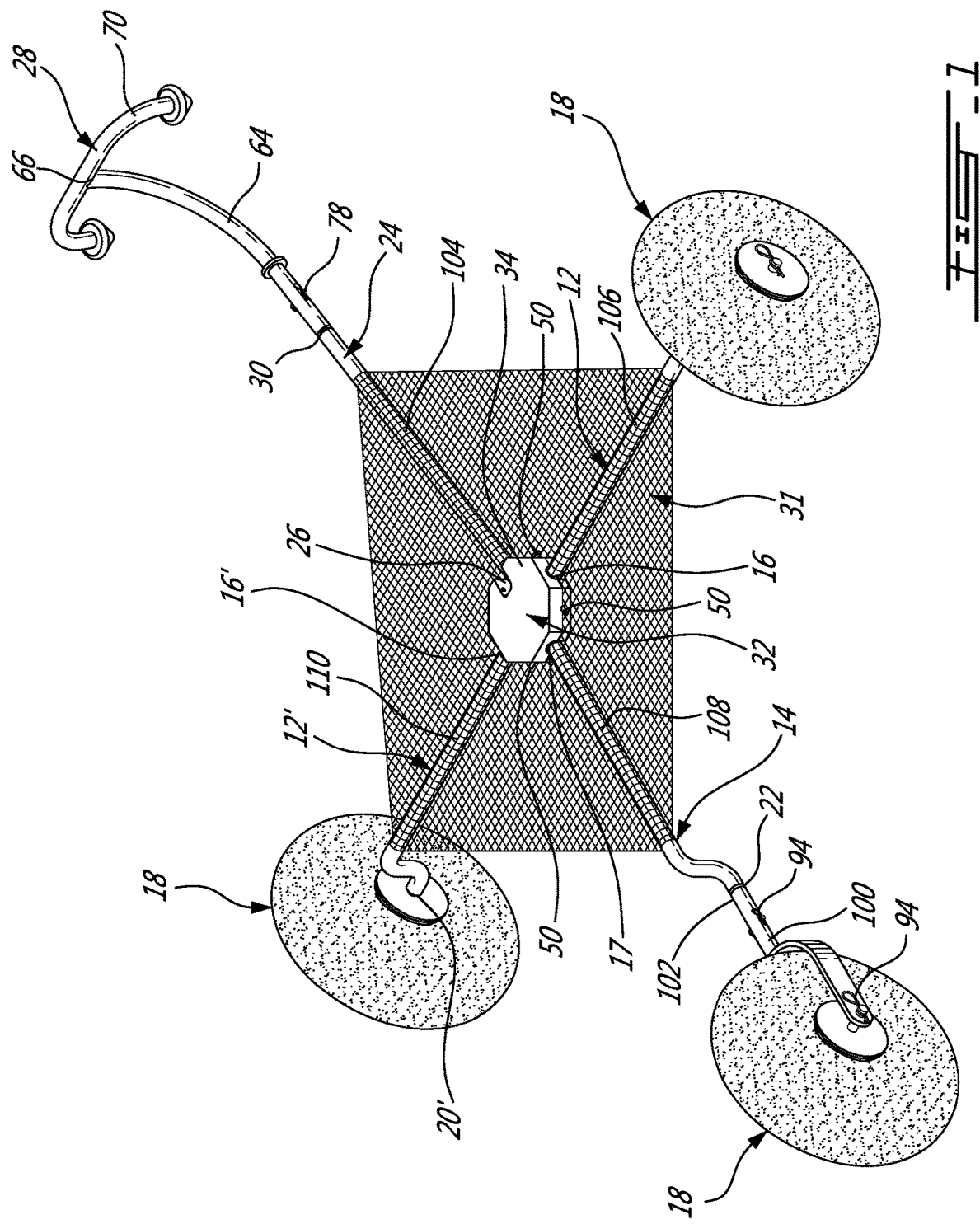
FIG. 1 is a perspective view of a beach trolley according to an illustrative embodiment.

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

A beach trolley 10 according to an illustrative embodiment will be described with reference first to FIG. 1.

As will become apparent upon reading the following description, the beach trolley 10 is configured to be used as a stroller or more generally as a cart to transport on a sandy ground such as on a beach a load such as small children and/or accessories and items. The trolley 10 can be moved rapidly from a deployed/trolling configuration to a portable collapse configuration for its carrying.

The beach trolley 10 comprises lateral arms 12 and 12' and a central arm 14 all joined together at their proximate end 16, 16' and 17 and each having a removable inflatable wheel 18 at their distal ends 20, 20' and 22, a pulling arm 24 joined at its proximate end 26 to the arms 12, 12' and 14 and being provided with a handle 28 at its distal end 30.

The beach trolley 10 further includes a flexible seat 31 attached to the arms 12, 12', 14 and 16.

The beach trolley 10 will now be described in more detail.

According to the illustrative embodiment, the arms 12, 12', 14 and 24 are in the form of bended hollow tubes.

The arms 12, 12', 14 and 24 are joined together via a connecting member 32. The member 32 is generally shaped like an octagonal prism having first and second opposite side faces 34-36 that are distanced so as to define a plurality of lateral sides 38-44 therebetween.

The member 32 includes three cylindrical grooves 46-48 on its second side face 36, each extending from a respective lateral side 38, 39 and 40 perpendicularly therefrom to a distance corresponding to about the fourth of the width of the member 32.

The first and second grooves 46 are located on opposite lateral sides 38 and 39 and the third groove 48 is located on a lateral side 40 which is located perpendicularly from the two lateral sides 38 and 39 therebetween.

Each of the two lateral grooves 46 pivotably receives a respective lateral arm 12-12' via a pin 50 (only one shown) and the third groove 48 pivotably receives the central arm 34, also via a pin 50. To allow clearance for the proximate ends 16-17 and 26 of the respective lateral arms 12-12' and central arm 14 when they pivot about their respective pin 50, each of the grooves 46-48 includes a rounded recess 52 at the bottom thereof.

The member 32 includes holes 54, 56 and 58 to receive the pins 50, which can be, for example, of the locking type.

Figure 8:
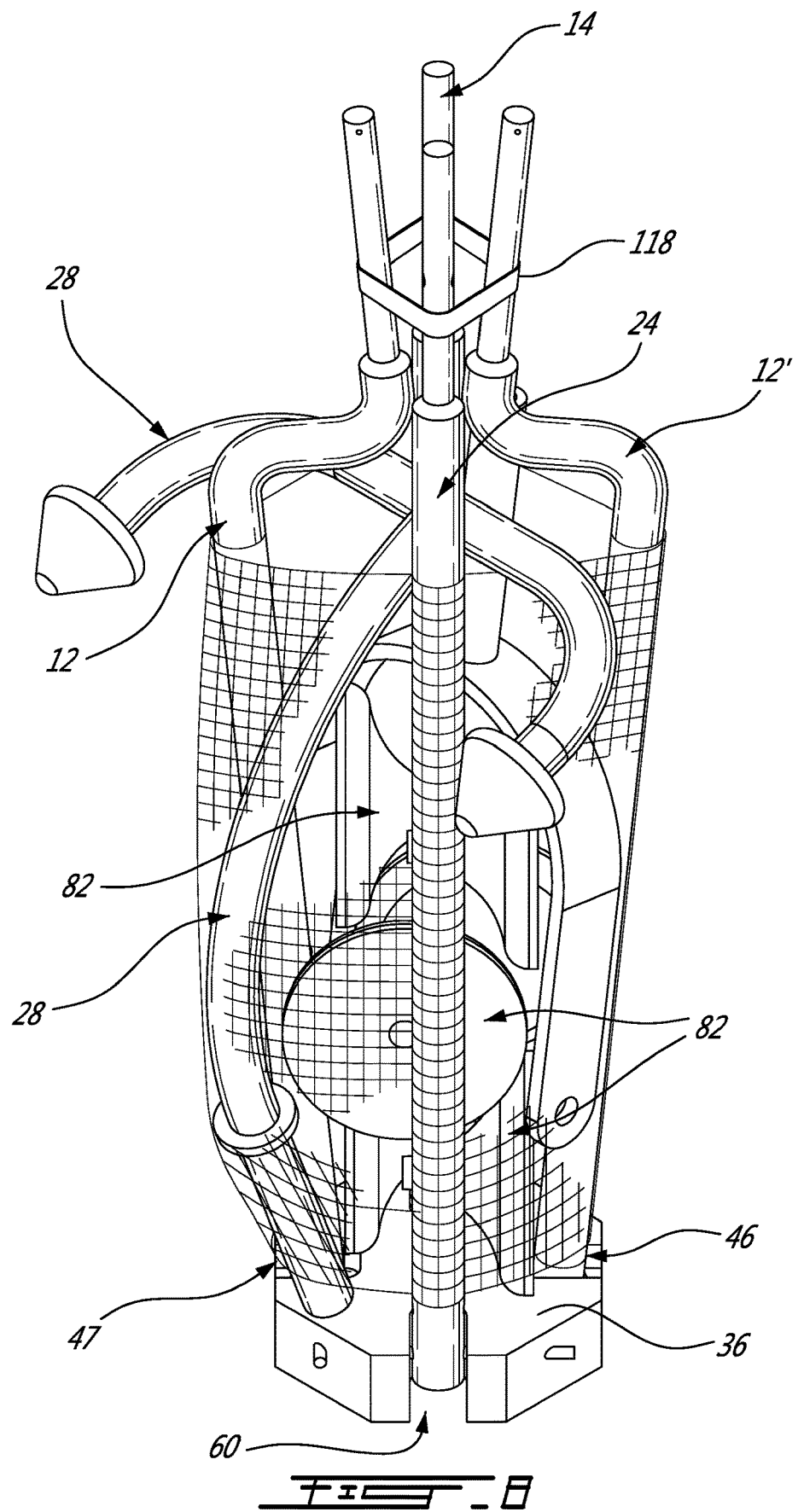
FIG. 8 is a perspective view of the beach trolley from FIG. 1, shown in a portable collapsed configuration.

The shape of the member 32, and more specifically of the grooves 46, are such that the two lateral arms 12, 12' and the central arm 14 are joined for pivotal movement between a first trolling position wherein the two lateral arms 12 and 12' and the central arm 14 generally lie within a same plane (see FIG. 1) and a second compact position wherein the two lateral arms 12, 12' and the central arm 14 are generally parallel (see FIG. 8).

In the first position of the arms 12, 12', 14 and 24, the trolley 10 is in a trolling configuration, while in the second position of the arms 12 and 14, the trolley 10 is in a folded configuration for its compact transport.

As can be better seen in FIG. 1, the configuration of the member 32 prevents any pivoting of the arms 12, 12' and 14 upwardly when they are in their first position and the member 32 is positioned so that its side face 36 faces downwardly (or its other side face 24 upwardly). To move the arms 12, 12' and 14 from their first to their second position, the member 32 is therefore pivoted so that the side face 36 faces away upwardly. This is allowed by the grooves 46-48, which act as mechanical stops for the arms 12 and 14.

The member 32 further includes a notch 60 that is made in the side 42 and which is aligned with the groove 48. The notch 60 pivotably receives the pulling arm 24 via a pin 50 secured in holes 62 for pivotal movement between a first position generally parallel to the arms 12 and 14 when they are in their second position (see FIG. 8) and a second position pivoted 180 degrees from the first position (see FIG. 6).

A person skilled in the art will appreciate that, contrarily to the arms 12-14, the mounting of the arm 24 in a notch 60 does not prevent its pivoting upwardly when the member 32 is positioned so that its side face 36 faces downwardly.

Figure 6:
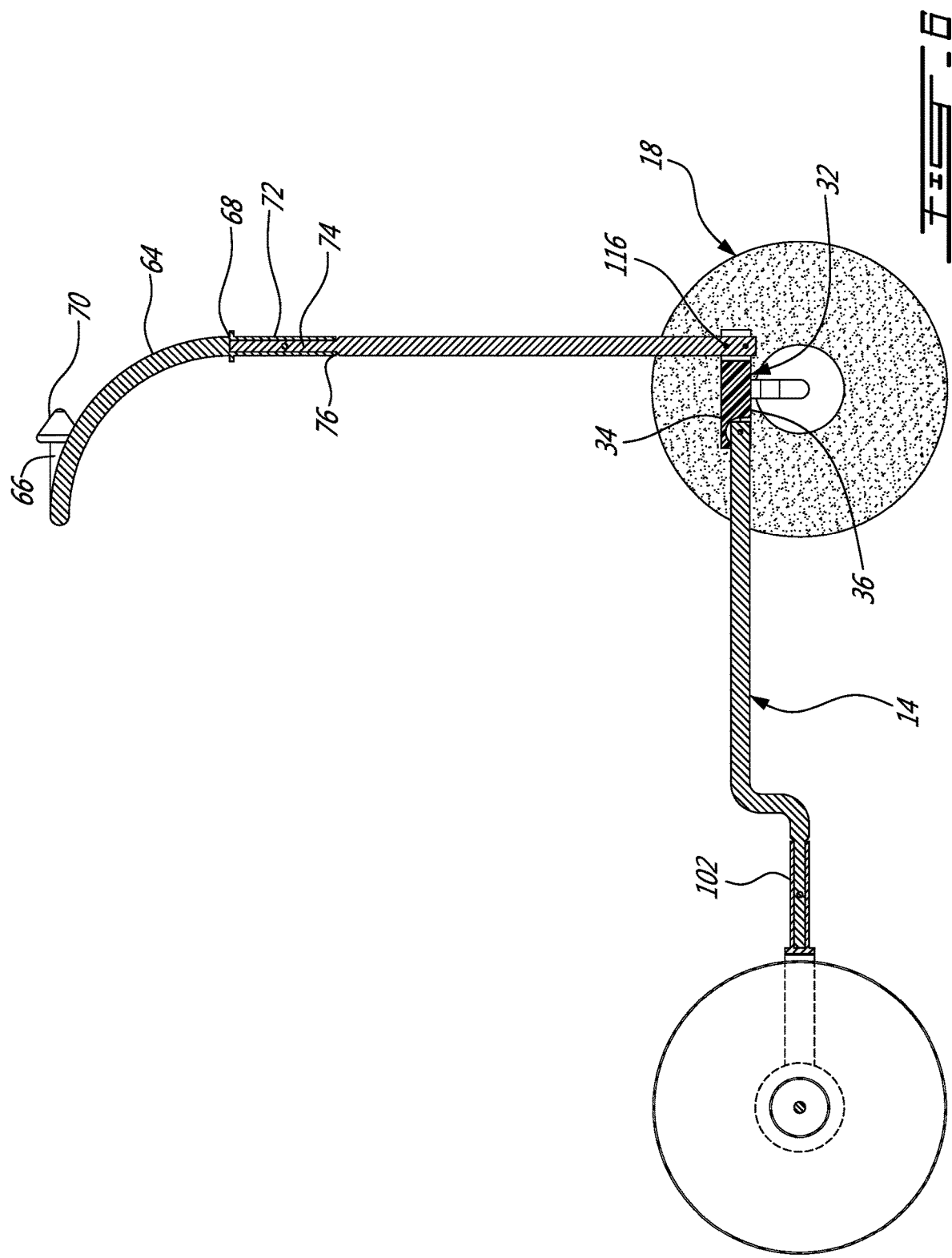
FIGS. 6 and 7 are respectively a perspective and a cross-section of the beach trolley from FIG. 1, showing the beach trolley in a chair configuration.

With reference to FIGS. 1 and 6, the handle 28 includes an arcuate arm 64 having longitudinal ends 66 and 68, a U-shaped handle bar 70, which is secured to the arcuate arm 64 at a first longitudinal end 66 thereof and a connector portion, in the form of a hollow tube portion 72, that extends from the arm 64 at the second longitudinal end 68 thereof. The hollow tube portion 72 acts as a female connector portion to mount the handle 28 to the pulling arm 24.

The pulling arm 24 includes a narrow portion 74 that is configured and sized to be complementary received within the hollow tube portion 72 of the handle 28. Both the narrow portion 74 of the pulling arm 24 and the hollow tube portion 72 of the handle 28 are provided with transversal holes (not shown) that become registered when the free end of the tube portion 72 abuts the shoulder portion 76 defined by the narrow portion 74. When the portions 72 and 74 are in such a relative position, a locking pin 78 or another locking mechanism can be used to lock the handle 28 in place.

It is to be noted that the handle 28 is not limited to the illustrated embodiment and can take other forms. Also, other mechanism or system than the illustrated male/female connection can be used to removably mount the handle to the pulling arm 24.

According to still another embodiment, the pulling arm 24 is provided with a non-removable handle portion (not shown).

One of the three identical inflatable wheels 18 will now be described in more detail with reference to FIGS. 1 and 3.

The wheel 18 comprises an inflatable tube ring 80 mounted on a polymeric rim 82 before or after it is inflated. The polymeric rim 82 includes a hole 83 at its center to receive the arm 12 or 14. While the rim 82 according to the illustrated embodiment is assembled from two identical parts, it can also be in the form of a one-piece body.

The tube ring 80 is made of vinyl or of any soft plastic material and includes a nozzle (not shown) allowing to be inflated orally or using a portable pump similarly to a conventional beach ball. The tube ring 80 is made of a material that is sufficiently rigid to be resistant to punctures on most ground.

According to another embodiment, the tube ring 80 is made of another flexible resilient material such as rubber.

Figure 3:
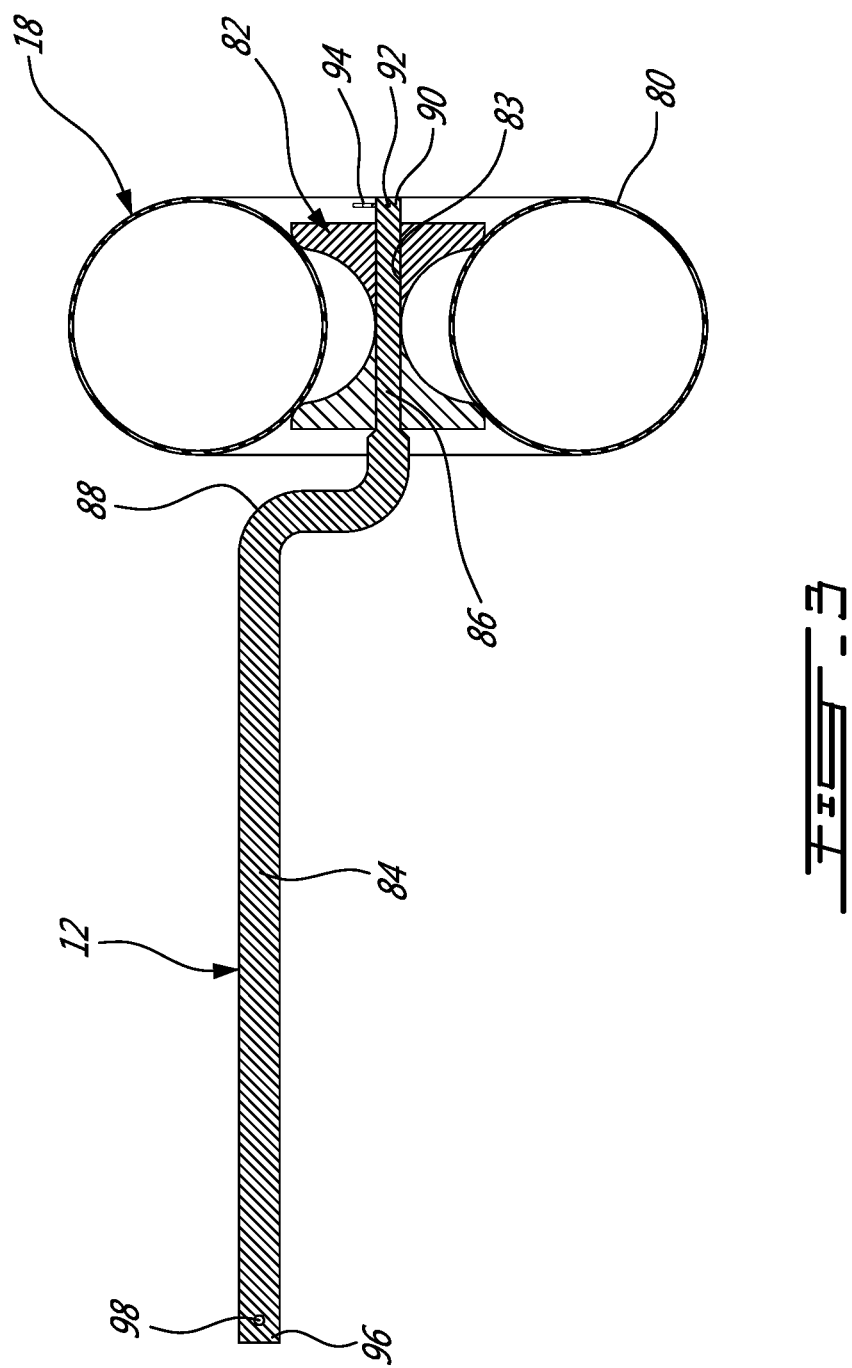
FIG. 3 is a cross-section of one of the two lateral arms of the beach trolley from FIG. 1; the arm being shown with an inflatable wheel mounted thereto.

With reference to FIG. 3, each of the identical arms 12, 12' and 14 includes an elongated straight portion 84, a narrow straight portion 86 that is parallel to the elongated portion 84, to be received within the hole 83, and an S-shaped portion 88 between the portions 84 and 86, that causes the portion 86 to be parallelly distanced from the portion 84. As illustrated in FIG. 1, the S-shaped portion 88 adds an additional distance between the arms 12, 12' and 14 and the ground when the wheels 18 are mounted thereto and when the arms 12, 12' and 14 are in their trolling position. According to the illustrative embodiment, such an additional distance is about 10 cm and the diameter of the wheels is 50 cm.

The intersection between the narrow portion 86 and S-shaped portion 88 defines a shoulder to limit the insertion of the portion 86 in the rim 82. The distal end 90 of the narrow portion 86 includes a transversal hole 92 to receive a lock-pin 94 that aims at preventing the withdrawal of the wheel 18 when it is mounted to the arm 12, 12' or 14.

The proximate end 96 of the arm 12, 12' or 14 includes a transversal hole 98 to receive the pin 50 to pivotably mount the arm 12, 12' or 14 to the member 32.

A fork 100 is provided to mount the central wheel 18 to the central arm 14. The fork 100 includes a hollow tube portion 102 that is shaped to complementary receive the narrow portion 86 of the arm 14. Both the central arm 14 and the central wheel 18 are secured to the fork 100 via lock-pin 94.

It is to be noted that the configuration of the S-shaped portions 88 can be different than illustrated. For example, they can more or less distance the arms 12, 12' and 14 from the ground, depending for example on the diameter of the wheels 18, which can also be different than illustrated.

According to another embodiment, the S-shaped portions 88 are located at another position along the arms 12, 12' and 14 than near the distal ends thereof.

Figure 4:
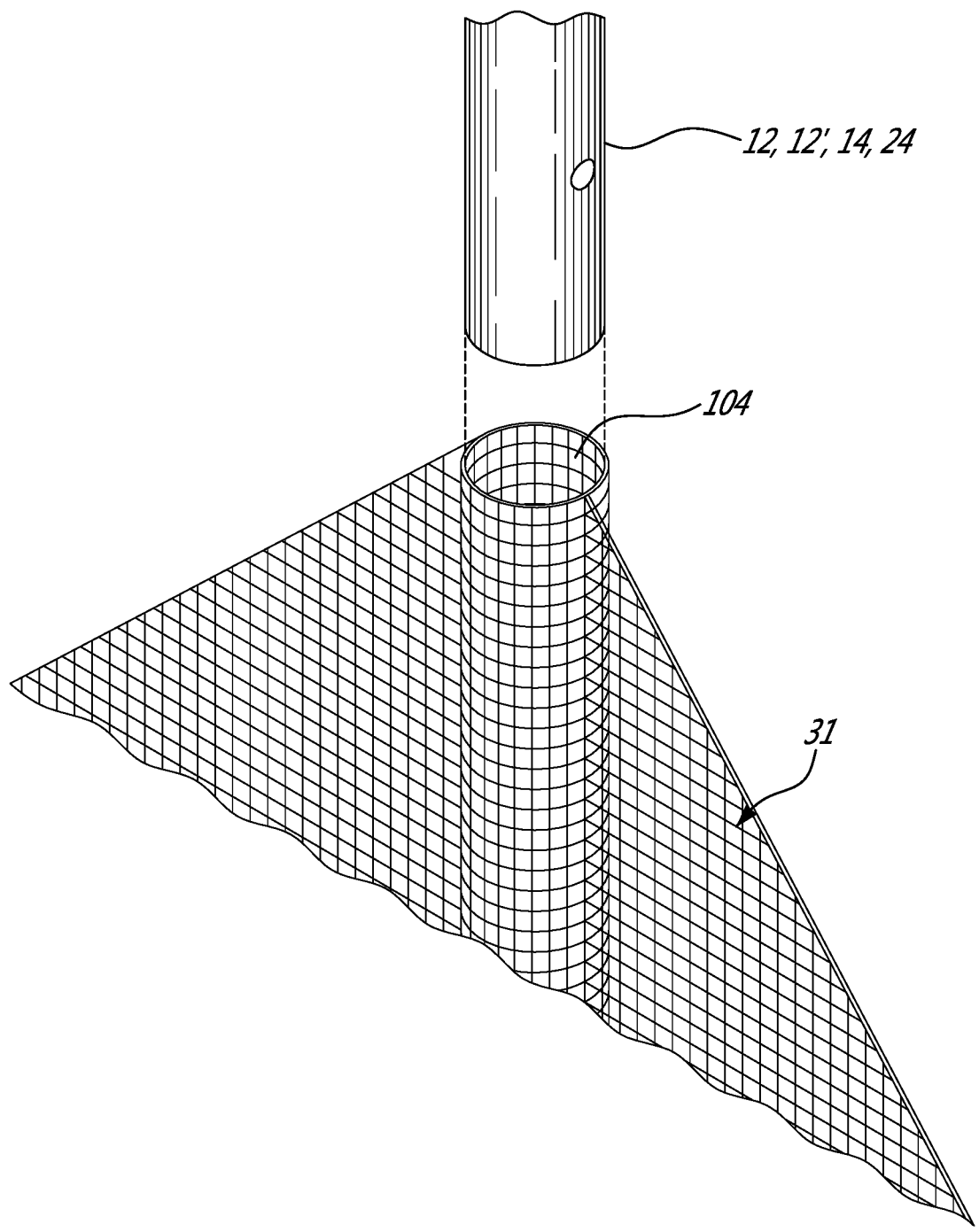
FIG. 4 is a close-up view showing the mounting of the flexible seat to one of the arms of the beach trolley from FIG. 1.

The flexible seat 31 is made for example of a vinyl braided or netted fabric and is generally rectangular in shape. The seat 31 includes four tubular portions 104-110 to receive the arms 12, 12', 14 and 24 respectively (see FIG. 4)

and a central hole (not shown) to allow passage for the member 32. The arms 12, 12', 14 and 24 can be secured to the connecting member 32 before or after insertion into the tube portion 104-110.

According to another embodiment, the central hole is omitted. According to still another embodiment, the tube portions 104-110 are omitted and the flexible seat 31 includes clip-receiving holes (not shown) to receive clips or mounting brackets (both not shown) to attach the seat 31 onto the arms 12, 12', 14 and 24.

The seat 31 and arms 12, 12' and 14 are sufficiently rigid to receive a load, such as one or two small children and/or accessories and/or equipment and/or bag, etc.

Also, the wheels 18 provides sufficient buoyancy to use the trolley 10 to carry such a load on sand.

In operation, the trolley 10 is used in the trolling configuration shown in FIG. 1 to carry a load, including for example children, on a sandy or solid ground. During displacement of the trolley 10, the load is seated on the flexible seat 31, wherein the handle 28 is used to pull the trolley 10.

As described hereinabove, the flexible seat 31 is made of a material that is sufficiently rigid to support the weight of the load carried.

According to the illustrated embodiment, the length of the lateral and central arms 12, 12' and 14 is about 70 cm, yielding a sufficiently large receiving surface on the seat 31 to accommodate two small children with item(s) (not shown).

Figure 5:
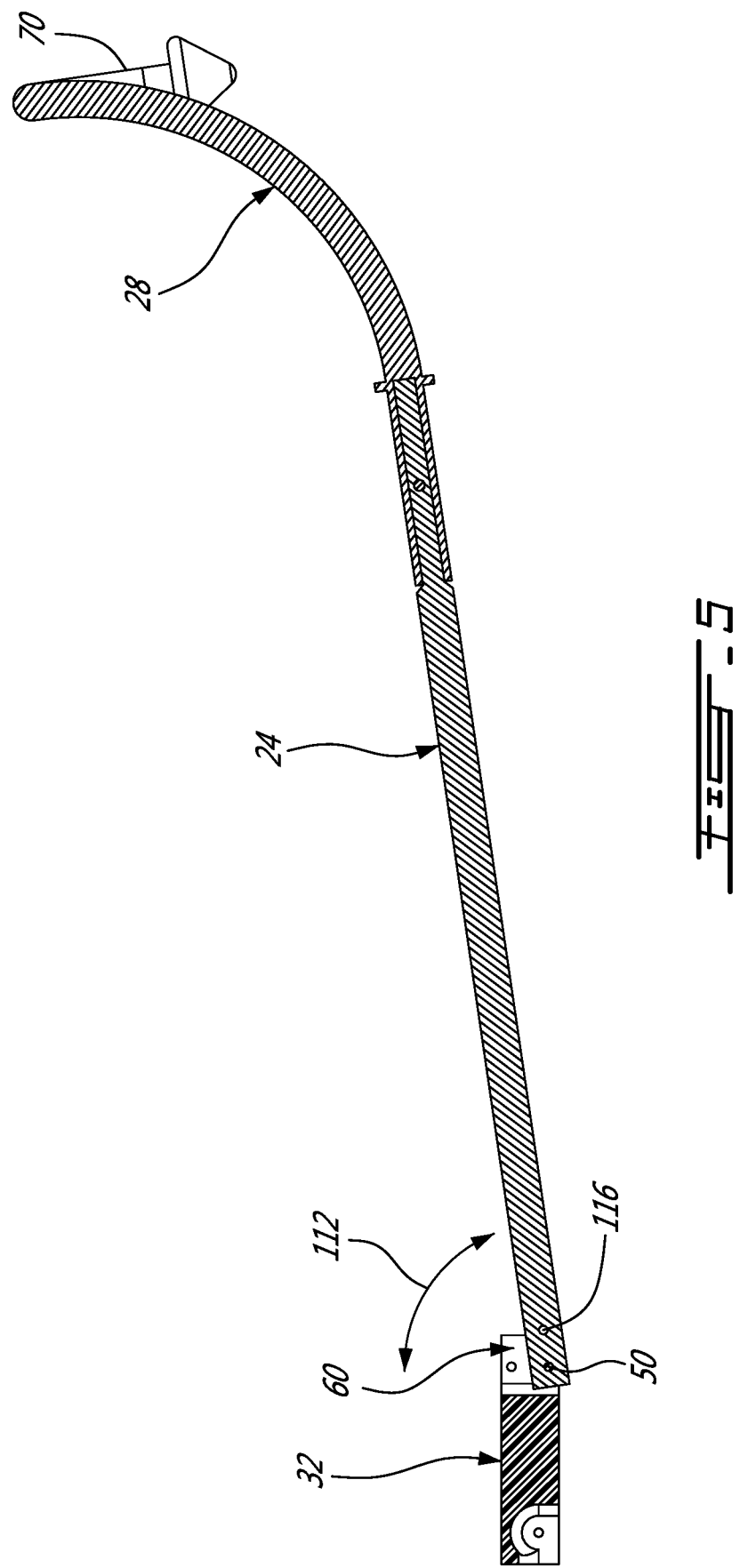
FIG. 5 is a cross-section of the handle of the beach trolley from FIG. 1, showing the pivoting thereof.

With reference to FIG. 5, and as described hereinabove, the arm 24 being mounted in a notch via a pin 50, it is free to pivot in a 180-degrees range relative to the member 32 (see arrow 112), allowing the arm 24 to be handled from different heights while pulling the beach trolley 10.

Figure 2:
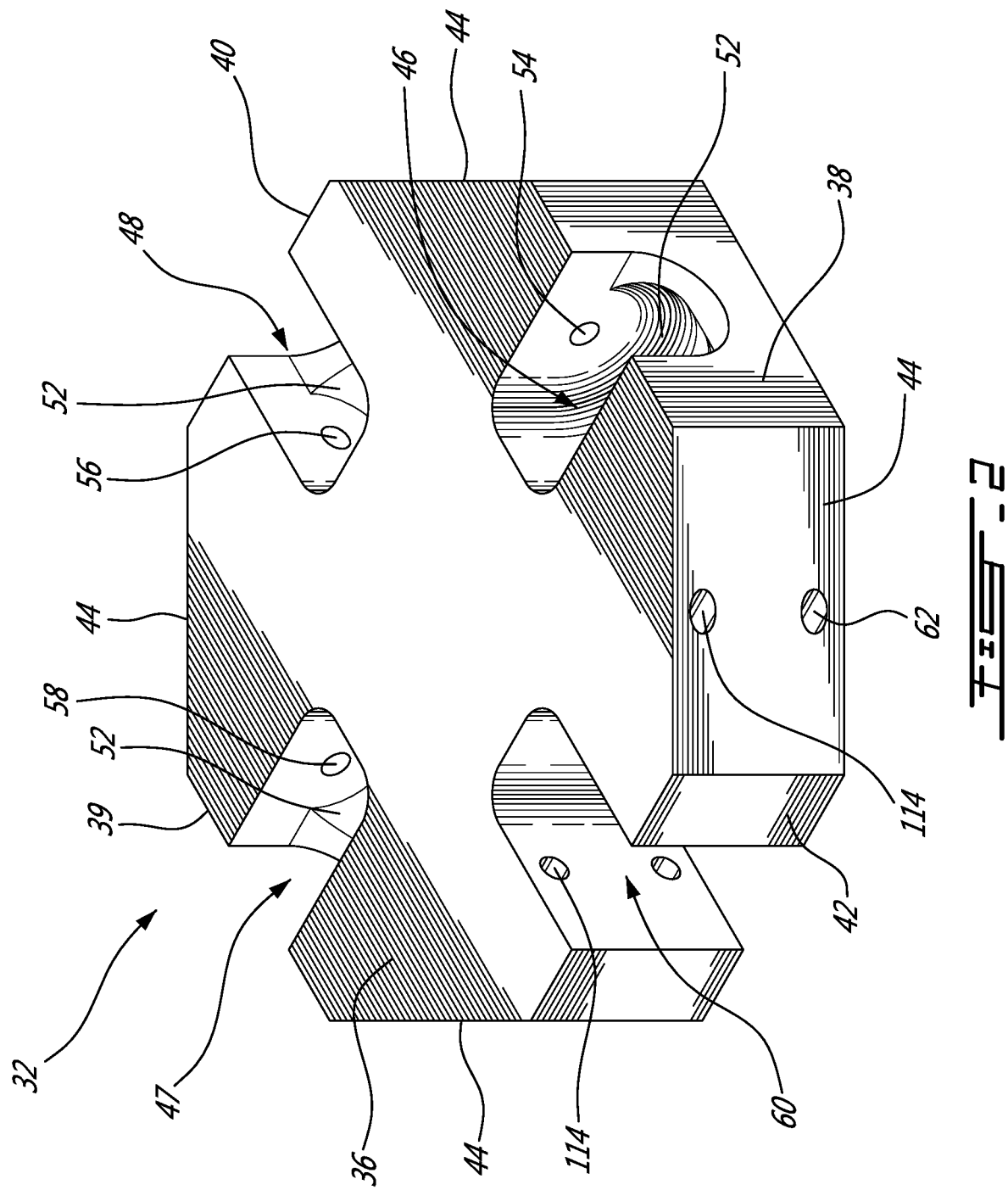
FIG. 2 is an isolated perspective view of the arm-connecting member of the beach trolley from FIG. 1.
Figure 7:
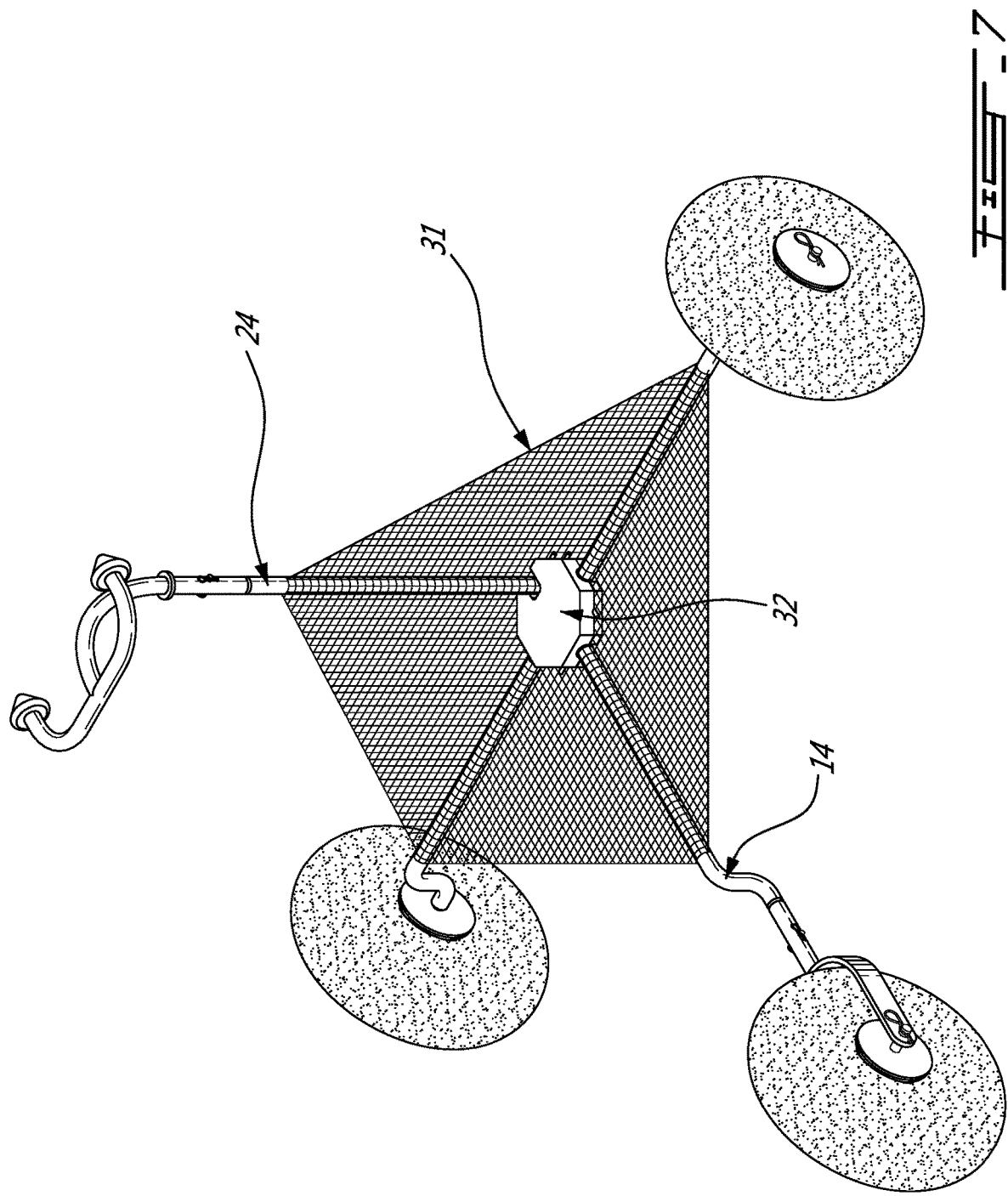

With reference to FIGS. 2, 6 and 7 both the arm 24 and the connecting member 32 includes holes 114 and 116 respectively that allows receiving a pin (not shown) to lock the arm 24 in a position where it is perpendicular to the faces 34 and 36 of the member 32, on the side of the face 34.

In this position, the vertical portion of the flexible seat 31 can be used as a back when the horizontal portion thereof is used as a seat.

Similarly, further holes can be provided on both the arm 24 and member 32 (not shown) allowing to lock the arm 24 in the same axis (or similar) than the central arm's 14 when the central arm 14 is in its trolling position. In such a position (not shown), the trolley 10 can be used as a small bed.

It is to be noted that, the handle 28 being removable, it can be replaced by a removable umbrella (not shown) to provide shade to the children seating on the trolley 10 while it is in the configuration of FIG. 7.

As illustrated in FIG. 8, the trolley 10 can be moved in a compact configuration (see FIG. 8), wherein the arms 12, 12', 14 and 24 are moved on the same side 36 of the member 32 so as to be generally parallel, after having removed the wheels 18, the fork 100, and the handle 28. These removed parts of the beach trolley 10 can then be inserted between the arms 12, 12', 14 and 24, allowing to carry the trolley 10 in a compact manner. The tube rings 80 of the wheels 18 are then previously deflated to allow their lodging between the arms 12, 12', 14 and 24. A rubber band 118 or another similar attachment can be used to prevent the arms 12, 12', 14 and 24 from moving while in this configuration.

A person skilled in the art, will now appreciate that, while the arms 12, 12', 14 and 24 are in the generally parallel configuration shown in FIG. 8, the flexible seat 31, while remaining attached to the arms acts as a bag, which keeps the removed parts 18, 28, 80 and 100 of the trolley 10 within the arms 12, 12', 14 and 24 when the trolley 10 is carried while in its compact configuration. Furthermore, the S-shaped portions 88 of the arms 12, 12', 14 causes the distal ends 20, 20' and 22 thereof to be so close as to define a closure for such bag.

The compact configuration of the trolley 10 can be used, for example, when it is stored, carried in a car (not shown) or carried by hand in cramped or crowded places.

Parts or all of the connecting arms 12, 12', 14 and 24, member 32, rims 82 and handle 28 can be made of a polymeric material, metal, such as steel, or of another rigid material.

It is to be noted that many modifications could be made to the beach trolley 10 described hereinabove and illustrated in the appended drawings. For example:

the wheels 18 are not limited to being inflatable;

the arms 12, 12', 14 and 24 are not limited to being bended hollow tubes and can be made of assembled pieces that can be hollow or not;

male-female connections described hereinabove can be inverted or replaced by other connecting mechanism;

the configuration of the arm connecting member 32 is not limited to the illustrated embodiment and can take other forms allowing to join the arms 12, 12', 14 and 24 for movement between a trolling position and a compact position wherein the arms 12, 12', 14 and 24 are generally positioned in a parallel relationship;

the member 32 and the attachment of the arms 12, 12', 14 and 24 thereto can be such that the member 32 is not flipped upside down relative to the ground when the trolley 10 is moved between the trolling and compact positions. For example, notches can be provided in the member instead of grooves, wherein pins can be used to lock the trolling positions of the arms;

another mechanism or element than the member 32 can be used to operatively join the arms 12, 14 and 24;

the lengths and relative dimensions of the arms 12, 14 and 24 can be different than illustrated;

the member 32 can include further holes to mount accessories therein such as an umbrella;

the pivot and locking pins are not limited to the illustrated and described embodiments.

Although a beach trolley has been described hereinabove by way of illustrated embodiments thereof, it can be modified. It is therefore to be understood that numerous modifications may be made to the illustrative embodiments and that the scope of the claims should not be limited by the preferred embodiment, but should be given the broadest interpretation consistent with the description as a whole.

What is claimed is:

1. A beach trolley comprising:

two lateral arms and a central arm, each having a removable wheel at one end and being together joined at the other end for pivotal movement between a trolling configuration wherein the two lateral arms and the central arm generally lie within a same plane and a compact configuration wherein the two lateral arms and the central arm are generally parallel;

a pulling arm joined to the two lateral arms and the central arm for pivotal movements towards and away the two lateral arms and the central arm; the pulling arm generally lying within a same plane as the central arm; and a flexible seat attached to the two lateral arms, to the central arm and to the pulling arm to form a seat therebetween when the two lateral arms and the central arm are in the trolling configuration and to form a bag therewith when i) the two lateral arms and the central arm are in the compact configuration and ii) the pulling arm is pivoted so as to be generally parallel to the two lateral arms and the central arm.

2. The beach trolley as recited in claim 1, wherein the two lateral arms, the central arm and the pulling arm are joined together by a connecting element.

3. The beach trolley as recited in claim 2, wherein the two lateral arms are pivotably mounted to the connecting element on first and second opposite sides thereof; the central arm and the pulling arm being pivotably mounted to the connecting element on third and fourth opposite sides thereof; the third and fourth opposite sides each being perpendicular to both the first and second opposite sides.

4. The beach trolley as recited in claim 3, wherein the connecting element includes at least one of a groove and a notch to receive a respective one of the two lateral, central and pulling arms therein.

5. The beach trolley as recited in claim 3, wherein the connecting element includes three grooves, each receiving a respective one of the two lateral arms and the central arm; the connecting element further including a notch that receives the pulling arm therein.

6. The beach trolley as recited in claim 2, wherein each of the two lateral arms, central arm and pulling arm is pivotably mounted to the connecting element via a pivot pin secured to the connecting element.

7. The beach trolley as recited in claim 2, wherein the connecting element is a one-piece body.

8. The beach trolley as recited in claim 2, wherein the two lateral arms and central arm are joined to the connecting element so as to be locked in the trolling configuration when the beach trolley rests on a surface while in the trolling configuration.

9. The beach trolley as recited in claim 2, wherein at least one of the connecting element and of the pulling arm includes a locking mechanism to lock the position of the pulling arm relative to the connecting element.

10. The beach trolley as recited in claim 1, wherein the two lateral arms, the central arm and the pulling arm, each includes a bended portion that causes their end that receives one of the wheels to be distanced from the other end thereof in a parallel relationship.

11. The beach trolley as recited in claim 1, wherein the pulling arm further comprising a handle.

12. The beach trolley as recited in claim 11, wherein the handle is removably mounted to the pulling arm at a free longitudinal end thereof.

13. The beach trolley as recited in claim 1, wherein the wheels are inflatable.

14. The beach trolley as recited in claim 13, wherein each of the inflatable wheels includes an inflatable tube ring mounted on a rim; the two lateral arms and central arm having a distal end that pivotably receives a respective one of the inflatable wheels via the rim thereof.

15. The beach trolley as recited in claim 14, wherein the central arm further having a fork that receives one of the inflatable wheels via the rim thereof.

16. The beach trolley as recited in claim 15, wherein the fork is removably mounted to the central arm.

17. The beach trolley as recited in claim 13, wherein the inflatable tube ring is made of vinyl or rubber.

18. The beach trolley as recited in claim 13, wherein the inflatable tube ring includes a nozzle for selectively inflating and deflating the tube ring.

19. The beach trolley as recited in claim 1, wherein the flexible seat is made of a polymeric material.

20. The beach trolley as recited in claim 1, wherein the flexible seat is made of a braided or netted material.

21. The beach trolley as recited in claim 1, wherein the flexible seat includes four tubular portions, each one receiving a respective one of the two lateral arms, the central arm and the pulling arm.

22. A beach trolley comprising:
a one-piece connecting element having first and second aligned elongated grooves on opposite side thereof, a third groove that is oriented generally perpendicular to the first and second grooves therebetween, and a notch that is aligned with the third groove on an opposite side of the connecting element thereof;
two lateral arms and a central arm, each having a removable inflatable wheel at one end and being attached at the other end to the connecting element in the first, second and third groove thereof for pivotal movement between a) a trolling configuration wherein the two lateral arms and the central arm generally lie within a same plane and b) a compact configuration wherein the two lateral arms and the central arm are generally parallel; each of the removable inflatable wheel having an inflatable ring tube removably mounted to a rim;
a pulling arm attached to the connecting element in the notch for pivotal movements towards and away the two lateral arms and the central arm; and
a flexible seat attached to the two lateral arms, to the central arm and to the pulling arm to form a seat therebetween when the two lateral arms and the central arm are in the trolling configuration and to form a bag therewith when i) the two lateral arms and the central arm are in the compact configuration and ii) the pulling arm is pivoted so as to be generally parallel to the two lateral arms and the central arm.

* * * * *